United States Patent [19]

Gassmann

[11] 3,894,190

[45] July 8, 1975

[54] SYSTEM FOR TRANSFERRING WIDE-BAND SOUND SIGNALS

[75] Inventor: Gerhard Günter Gassmann, Berkheim, Germany

[73] Assignee: International Standard Electric Corporation, New York, N.Y.

[22] Filed: Jan. 30, 1974

[21] Appl. No.: 438,124

[30] Foreign Application Priority Data

Feb. 28, 1973 Germany ............................ 2309987
Apr. 26, 1973 Germany ............................ 2321230

[52] U.S. Cl... 179/15.55 R; 179/15 BM; 179/15 BP
[51] Int. Cl. ................................................ H04j 3/18
[58] Field of Search.... 179/15.55 R, 15 BM, 15 BP, 179/15 AS, 1 SA, 1 SC, 1 SG

[56] References Cited

UNITED STATES PATENTS

| | | | |
|---|---|---|---|
| 2,870,260 | 1/1959 | Guenther | 179/15 AS |
| 3,139,487 | 6/1964 | Logan | 179/15.55 R |
| 3,431,362 | 3/1969 | Miller | 179/15.55 R |
| 3,471,646 | 10/1969 | Magnuski | 179/15 BM |

*Primary Examiner*—David L. Stewart
*Attorney, Agent, or Firm*—John T. O'Halloran; Menotti J. Lombardi; Peter Van Der Sluys

[57] ABSTRACT

A system for transmitting wide-band signals over a narrow band by directly transmitting low frequency range signals and transmitting amplitude information of partial upper frequency ranges on pilot frequencies is made compatible with existing receivers by making the pilot frequency signals imperceptible in ordinary receivers through the use of a phenomenon known as the masking effect. This is achieved by positive modulation of the pilot frequencies and attentuation to a level 10 db below the level of the low frequency range. If sequential transmission is used, a low level sync signal is produced that does not exceed the signal-to-noise level in existing receivers and is therefore suppressed. In the receivers of the present invention, the low level sync signal is selectively evaluated for control and synchronization of a clock generator but is suppressed below the signal-to-noise ratio of the output and is therefore made inaudible. The sync signal is further processed to control the gain of a modulated pilot signal amplifier and to automatically switch off the upper frequency range signals in the event of sync signal failure or synchronization failure.

17 Claims, 6 Drawing Figures

C

SYSTEM FOR TRANSFERRING WIDE-BAND SOUND SIGNALS

BACKGROUND OF THE INVENTION

1. Field of the Invention

The present invention relates to a system for transferring wide-band sound signals and more particularly to a system wherein a lower frequency range is transmitted directly and a higher frequency range is divided into partial bands of which only amplitude information is transmitted on pilot signals.

2. Description of the Prior Art

Speech signal band width compression systems have heretofore been proposed for use in telephone systems so that the system transmission capacity may be expanded. These systems have been successful to a limited degree within the band width of normal speech but have not been used for transmitting the wide-band sound signals required for high fidelity music reproduction.

Co-pending and commonly assigned U.S. Patent application Ser. No. 334,525, filed Feb. 22, 1973, teaches a system for transmitting wide-band sound signals over a narrow frequency band. In this system the sound signal is divided into a lower and a higher frequency range and the lower frequency range is transmitted directly. The higher frequency range is further divided into partial frequency ranges by means of band pass filters. Amplitude information for each partial frequency range is transmitted as a signal on a modulated pilot frequency. For reproducing the total sound signal, the amplitude information of the partial frequency ranges is used to modulate synthetic signals lying approximately in the middle of the individual partial frequency ranges. The synthetic sound signals of the partial frequency ranges are then added to the directly transmitted signals of the lower frequency range to produce the total sound signal.

The amplitude information of the individual partial frequency ranges may be transferred simultaneously on separate pilot frequencies for each partial frequency range or may be sequentially transferred, in fixed time slots on a single pilot frequency. The pilot frequency or frequencies themselves are suppressed at the reproducing or receiving end by a low pass filter for the low frequency range and thus become inaudible.

In the event that such a system were introduced to replace a conventional broadcasting system, one of the difficulties encountered would be that the existing receivers of the conventional system do not have low pass filters for suppressing the pilot frequency signals and a distorted signal would result. In a practical situation, the different type systems would have to coexist for a certain transistion period; therefore, it is essential that a system be used that is compatible with existing receivers.

SUMMARY OF THE INVENTION

The present invention contemplates a system wherein wide-band sound signals may be transmitted over a narrow band and thereafter received by existing receivers so that the pilot signals used to transmit amplitude information remain inaudible and do not distort the sound produced by the existing receivers. At the transmitting end a pilot signal is positively modulated with amplitude signals in such a manner that on a time average the amplitude of the modulated pilot signal is lowered with respect to the amplitude of the signal of the lower frequency range by a factor P which represents the so-called limit of perceptibility. If sequential transmission over a single pilot frequency is desired, the amplitude of a sync signal is maintained below the level of the noise in the existing receivers so that distortion does not result. At the receiving end the sync signal is selectively evaluated in such a manner that the signal-to-noise ratio of the selected sync signal essentially corresponds to the signal-to-noise ratio of the signal of the lower frequency range so that it is not reproduced with the lower frequency range signals.

The system according to the present invention has the advantage that it can be used in Am radio transmission without interferring with the many existing radio receivers in operation while it permits a considerably improved sound signal transmission for use by a new generation of receivers. The invention makes use of the well-known ear-physiological effect called the masking effect.

In such a system, disturbing influences could adversely effect the transmission of the pilot signal containing the amplitude information. The result may be that the pilot signals become further modulated with the transmission interferences so that the synthetic signals reproduced by the receiver are distorted. Therefore, the present invention also contemplates a further embodiment of the system at the receiving or reproducing end in such a manner that the high frequency range signals will be switched off if the sync signal fails, is not present, or shows too great a departure from normal.

The sync-signal and a reference signal are fed to two multiplicative mixers, one of the reference signals being fed to the multiplicative mixers has a 90° phase shift, and the other is fed directly. The reference signal is derived from a clock generator by frequency division with the division factor being ½*n*, where *n* is the number of upper frequency ranges. The output voltages of the two multiplicative mixers are each filtered with a low-pass filter and one of the two filtered voltages serves for frequency control and thus to synchronize the clock generator, and that the other filtered voltage is used as a control voltage for gain control, and when dropping below a predetermined level, is used to switch off the high frequency range signals.

In one embodiment of the invention the rotating switch is replaced with N individual switches which are successively activated from the output of a shift register coupled back to itself. Two outputs of said shift register control one frequency -halving flip-flop each, the signals of which outputs are spaced $n/2$ clock pulses apart. The output of one flip-flop is connected to the enable input of the other flip-flop to insure that the output voltage of one flip-flop always lags or leads that of the other by 90°. The output voltages of the two flip-flops are applied as reference voltages in quadrature to the two previously mentioned multiplicative mixers, to which the sync-signal is additionally applied directly.

The primary object of the present invention is to provide a wide-band sound signal transmitting system which is compatible with existing receivers.

A further object of the present invention is to provide a system wherein the pilot signals remain inaudible in existing receivers.

A further object of the present invention is to provide a system wherein no mal-function will result if the synchronizing signal fails.

The foregoing objects and advantages of the invention will be best understood with reference to the following description in conjunction with the drawings.

DESCRIPTION OF THE INVENTION

Figure 1:
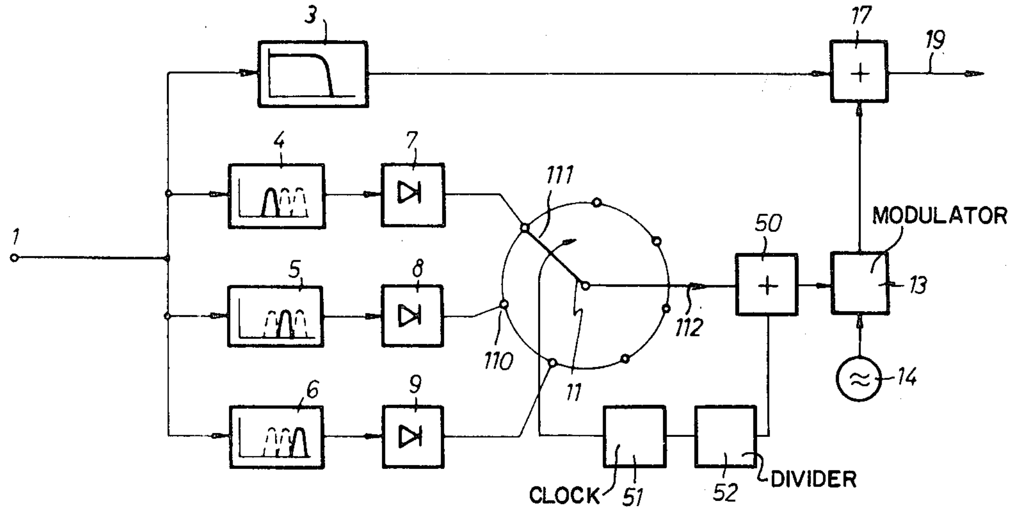
FIG. 1 is a schematical block diagram of a transmitter of the system of the present invention in which amplitude information is sequentially transmitted.

The wide-band sound signal to be transferred is applied to the input terminal 1 in FIG. 1. To this terminal 1 is connected a low pass filter 3 whose bandwidth or cut-off frequency lies in the range of about 4 to 7 KHz depending on the qualitative requirements imposed on the sound signal. In parallel with the low-pass filter 3 are connected band-pass filters 4, 5 and 6 and, if necessary, further band-pass filters, which divide the higher frequency range into partial ranges. For example, an octave may be divided into 12 partial ranges according to the semitones of this octave. The filters 4, 5 and 6 are followed by rectifiers 7, 8 and 9, respectively, at whose outputs appears a volume-dependent amplitude information of the associated partial frequency range. In the present example, the amplitude information is successively and cyclically taken off recitifers 7, 8 and 9 by a rotating switch 11. It is assumed that the rotational frequency of the switch 11 is $f1$. Accordingly, if the number of switch terminals 110 is $n$, the frequency of the sample values of the amplitude information will be $fT = n \cdot f1$. The clock generator 51 determines the step frequency $fT$ of the switch 11. Via an adder circuit 50, whose function will be explained hereinbelow, the successive amplitude information is applied to a modulator 13 in which this amplitude information modulates the pilot frequency delivered by a pilot generator 14. The modulated pilot signal and the sound signal appearing at the output of the low-pass filter 3 are added in an adder circuit 17 to form a common output signal 19. As already indicated, the invention makes use of the so-called masking effect. This will now be explained.

If a sinusoidal signal whose freqency lies within the spectrum from 0 to $f$ gr is admixed with a noise signal having a spectrum from 0 to $f$ gr, e.g. the output signal of the low-pass filter 3, it will be found that the amplitude of the admixed sinusoidal signal may be surprisingly large before the signal is clearly perceived. Even if individual differences are taken into account, a so-called limit of perceptibility can be determined.

More thorough investigations and definitions concerning this subject are contained in a book by E. Zwicker and R. Feldtkeller entitled "Das Ohr als Nachrichtenempfanger," published in 1967, Hirzel-Verlag, Stuttgart.

If the frequency of the aforementioned sinusoidal signal is changed beyond the frequency $f$ gr toward higher frequencies, the amplitude of the sinusoidal signal must be reduced to a very low value if the same (non-) perceptibility is to be maintained as in the case where the sinusoidal signal lies within the spectrun 0 to $f$ gr.

However, practical experiments have shown that the masking effect, i.e., the same degree of non-perceptibility, is not exactly tied to the upper limit of the frequency spectrum, but that the same masking effect is still effective, in a certain measure, above the frequency $f$ gr. The experiments have shown that an acceptable perceptibility value is attained if the level of the admixed sinusoidal signal is placed about 10 dB below that of the noise signal. This masking effect occurs not only with noise signals, but also with music and other sound signals, the only difference being that the threshold of overhearing shifts upwards and downwards in the rhythm of the main signal amplitude.

In the system according to the invention, the pilot signal appearing at the output of the modulator 13 is therefore modulated so that this condition is fulfilled, i.e., at least in the vast majority of all cases, the amplitude of the pilot signal is large only if the main signal, too, has a large amplitude, and small if the main signal has a small amplitude, and has virtually disappeared if the main signal has disappeared. This is achieved by "positive modulation" with an amplitude which has been reduced, on a time average, by a factor P with respect to the amplitude of the lower frequency range, use being made of a phenomenon which will be briefly explained with the aid of FIG. 3. It has been found that there is practically no music signal in which overtones occur in the upper frequency range, designated $b$ in FIG. 3, without corresponding fundamental tones being present in the lower frequency range. For the system this means that the amplitude information of the partial ranges of the upper frequency range correlate with the signal of the lower frequency range. Using positive modulation in the modulator 13 of FIG. 1, it is therefore sufficient to fix the factor P for the reduction of the modulated pilot signal by presetting the modulation factor of modulator 13. Then, the absolute changes in amplitude in the rhythm of the main signal are insured by the above-described correlation.

Figure 2:
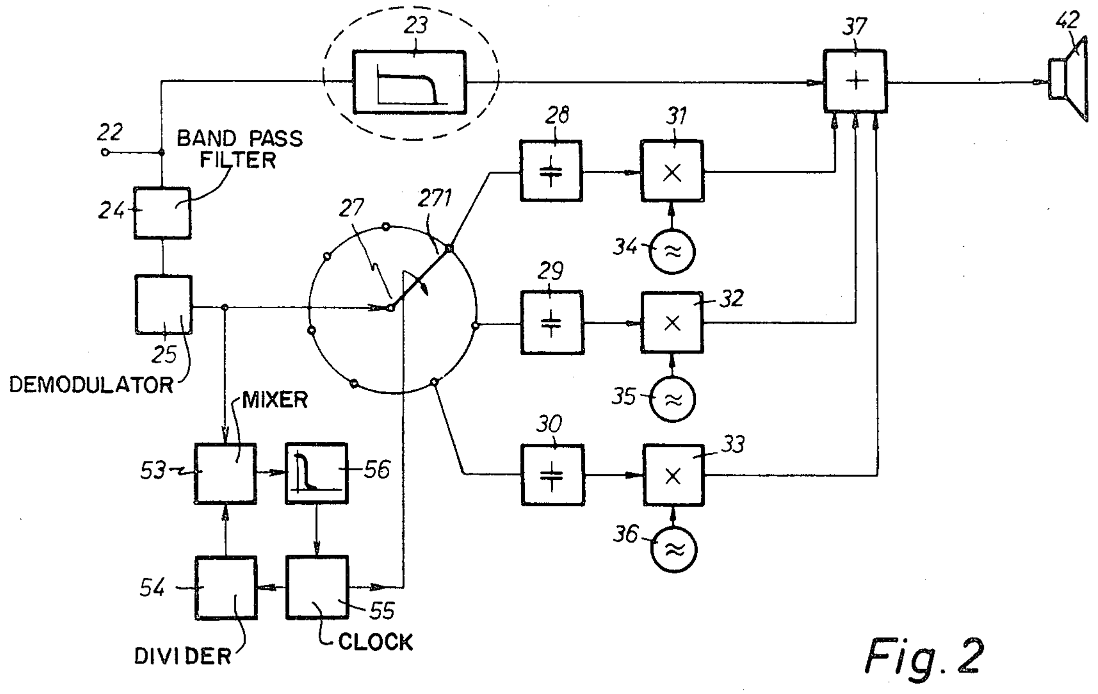
FIG. 2 is a schematical block diagram of a receiver of the system of the present invention.

FIG. 2 shows a block diagram of the reproducing end which is an example of the sequential transfer technique of the amplitude information.

Figure 3:
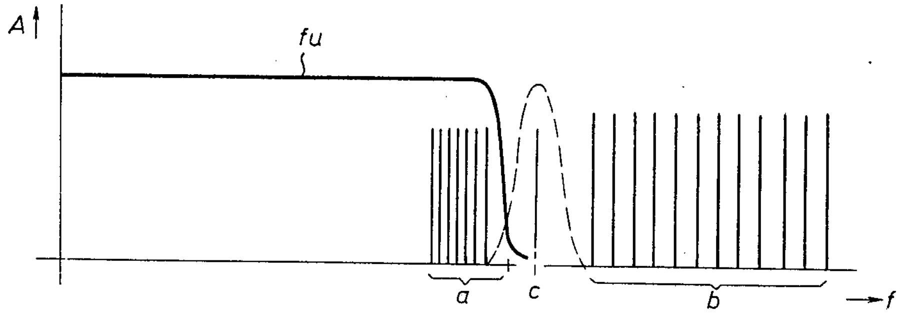
FIG. 3 shows a frequency spectrum as used in the present invention.

The transferred total signal 19, which consists of the directly transferred sound signal of the lower frequency range and the pilot signal and has been modulated with the amplitude information of the partial ranges of the upper frequency range and has been lowered by the factor P with respect to the sound signal of the lower frequency range, is applied to the input terminal 22. As indicated in FIG. 3 by the reference character $c$, the frequency of the pilot signal is slightly higher than the cut-off frequency of the sound signal passed by the low-pass filter 3.

The low-pass filter 23 of FIG. 2 is unnecessary (indicated by the broken border line) as the modulation according to the invention does not interfere with the pilot signal.

Thus it is insured also for older receiver models which are not designed for the evaluation and acoustic reproduction of the amplitude information that the reception is not audibly disturbed by the pilot signal. The desired compatibility has been achieved.

The reproduction unit of FIG. 2, which is equipped in accordance with the system of the invention, has a bandpass filter 24 which passes only the frequency range of the pilot signal and is followed by a demodulator 25. The demodulated sequence of the amplitude information is fed to the rotating switch 27, from whose "contacts" the volume information assigned to the individual time channels is taken and applied to storage capacitors 28, 29, and 30 and to further storage capacitors (not shown). The storage capacitors deliver the volume information of the individual channels to modulators 31, 32, 33 and following modulators, which, in turn, modulate the signals of the oscillators 34, 35, and 36, which generate the equivalent frequencies for the respective partial range. 37 is the adder circuit with which the volume controlled equivalent signals and the base band delivered by the low-pass filter 23 are added together.

In the application within the scope of the invention, the ear-physiological requirement for a reduction of the pilot signal by the factor P is no disadvantage regarding the signal-to-noise ratio if the pilot bandwidth is chosen to be correspondingly narrow. If, for example, the bandwidth of the lower frequency range, or, in other words, the frequency limit $f_{gr}$ = 5 KHz, and the bandwidth of the pilot signals 500 Hz, both signals will have the same signal-to-noise ratio if the voltage amplitudes differ by 1:3.3, which corresponds to 10 dB, for the difference in bandwidth of 1:10 improves the signal-to-noise ratio of the pilot signal by $1 : \sqrt{10}$, so that, in spite of a reduction of the pilot amplitude by this factor, the same signal-to-noise ratio is maintained. Since older receivers, in the frequency range in which the pilot signal is transmitted, generally have a reduction of 10 to 20 dB, anyway, the total reduction increases to 20–30 dB if the pilot signal is reduced by 10 dB at the transmitting end. Ear-physiological experiments have shown that a reduction by as little as 15 to 20 dB makes the pilot signal inaudible. Even in case of a total reduction of only 10 dB the pilot signal is not disturbing because it correlates with the upper spectral lines of the region *a* in FIG. 3 and thus acoustically simulates a smaller widening of the upper frequency range. Thus, it causes a slight, synthetic treble boost, so to speak.

It has already been mentioned that, if the main signal has disappeared, the pilot signal must have disappeared, too, i.e., must be inaudible.

This raises the question of synchronization in case of sequential transfer, i.e., it must be insured that synchronization is maintained in the above case, too.

As shown in FIG. 1, the clock generator 51 is followed by a frequency divider which divides the clock or step frequency $fT$ of the rotating switch at a ratio of $1:2n$. The AC signal obtained in this way is added to the pilot signal in the adder circuit 50, for example. Since, however, masking is not longer effective when the main signal has disappeared. i.e. during quiet intervals, the constantly present sync signal must be maintained below the normal noise level. Assuming that the latter is −50 dB and considering that 20 dB are caused by older receivers, the sync signal must be lowered by 30 dB. To achieve for the sync signal, too, the same signal-to-noise ratio as for the main signal and the pilot signal, at the receiving end the bandwidth for evaluating the sync signal must be reduced to such an extent that this condition is satisfied. 30 dB corresponds to a voltage reduction of 1:33. Such a voltage reduction will result in a signal-to-noise ratio corresponding to that of the main signal only if the bandwidth for evaluating the sync signal is $33^2$ smaller than the bandwidth of the main signal. $33^2$ equals about 1,100. Thus, at a bandwidth of the lower frequency range of 5 Khz, the bandwidth for the sync signal must be reduced to 0.55 Hz at the receiving end. Under these conditions, the pilot signal, including the sync signal, is inaudible although the sync signal has the same signal-to-noise ratio as the lower frequency range.

In FIG. 2, the sync signal is evaluated by feeding the total output signal of the demodulator 25 to a symmetrical, multiplicative mixer 53, to whose second input the output signal of a frequency divider 54 is applied. This frequency divider 54 divides the frequency of the clock generator 55, like the frequency divider 52, at a ratio of $1:2n$. In the synchronized condition, the DC voltage component of the output voltage of the multiplicative mixer 53 thus depends only on the phase difference between the sync signal and the divided-down signal. For example, the amplitude of the sync signal is positive in case of positive phase deviation, zero in case of phase coincidence, and negative in case of negative phase deviation. With the following low-pass filter 56, which has a bandwidth of about 0.55 Hz, this DC voltage component is separated from the considerably higher-frequency AC components. In the non-synchronized condition, instead of the DC voltage, an AC voltage is obtained according to the frequency deviation, but in the present case, this deviation must not appreciably exceed 0.5 Hz. The filtered voltage is used to synchronize the clock generator 55.

Figure 4:
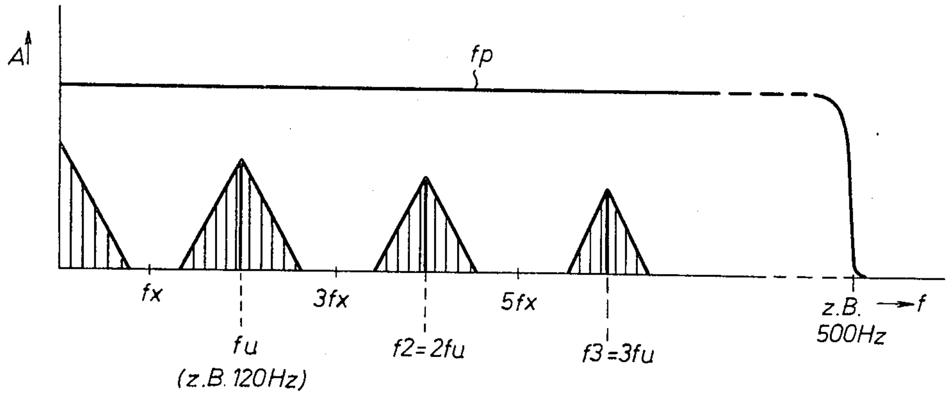
FIG. 4 shows a spectrum of the pilot frequency band for sequential transmission of amplitude information.

In case of sequential transfer of the amplitude information for the equivalent tones, the control signal, on which the pilot signal is modulated, has a spectrum as shown in FIG. 4.

The frequency $f1$ corresponds to the rotational frequency of the rotating switches 11 and 27. $f_2$ and $f_3$ correspond to $2 \cdot f1$ and $3 \cdot f1$, respectively, etc. These spectral lines occur without secondary spectra if a continuous tone is transmitted. Since, however, the equivalent tones occur chiefly in rhythmic instruments, a secondary spectrum groups around each spectral line; the faster any "tremelo" in the music being played, the farther the secondary spectrum from the spectral line. Such a spectral line also lies at the frequency $f_o$, i.e. at a DC voltage, which means that the control signal, like a television signal, has a so-called "DC voltage component" with which a low-frequency component is associated. Thus, this "DC voltage component," too, fluctuates with the beat of the music. The representation of FIG. 4 shows that at the frequency $fx$ the spectrum has a gap or is very much lowered. It is therefore proposed according to the invention to transmit the sync signal for synchronizing the rotating switch at the receiving end at this frequency $fx$, i.e., at half the rotational frequency of the rotating switch. For this reason, the frequency dividers 54 and 52 divide the frequency of the clock signal by the value $2n$ rather than by the value $n$. A sync signal which occurs only at a single frequency, in this case $fx$, is automatically a sinusoidal signal. As the spectral representation shows, however, it is also possible to transmit components of the sync signal at 3 $fx$, 5 $fx$, etc. In other words: The sync signal may also be a signal with only odd harmonics, i.e., a symmetrical trapezoidal voltage, for example. Such a signal has the advantage that, for synchronization, the phase shift is transmitted more exactly than with a purely sinusoidal signal (e.g., because of more definite zero crossings).

If, in special applications of the system, the correlation between the sound signal of the lower frequency range and that of the upper frequency range should not exist, a control voltage derived from the amplitude of the sound signal of the lower frequency range may, of course, be used to correct the P-factor, which, of course, necessitates corresponding measures at the reproducing end.

Figure 5:
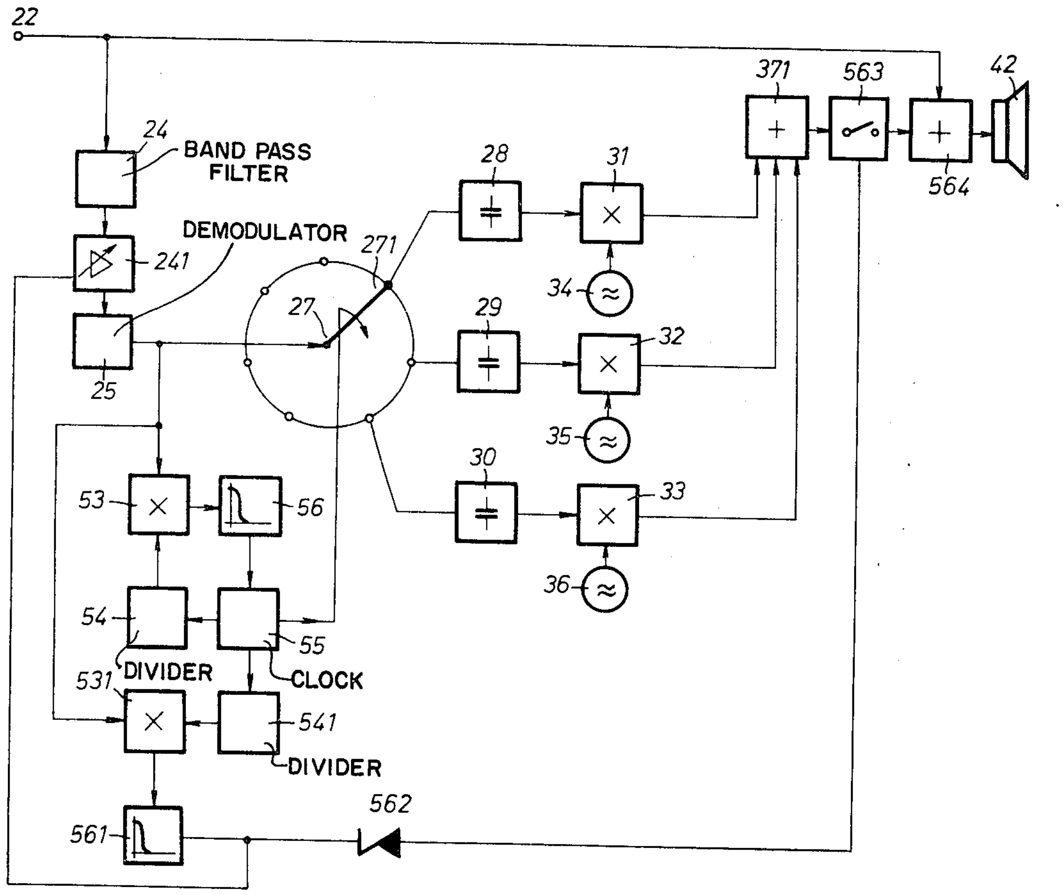
FIG. 5 shows a schematical block diagram of a further embodiment of the present invention.

Referring to FIG. 5 there is shown another embodiment of the present invention wherein the high frequency range signals are switched out in the event of a sync signal mal-function. The transferred total signal 19 from FIG. 1 is applied to the input terminal 22. It consists of the directly transferred sound signal of the lower frequency range and the pilot signal, which has been modulated with the amplitude information of the partial ranges of the upper frequency range and lowered by the factor P with respect to the sound signal of the lower frequency range and which contains the sync signal, whose amplitude is very small as compared with the possible maximum amplitude of the total pilot signal. Its frequency corresponds to half the repetition frequency of the sequential transfer of the amplitude information.

The reproduction unit has a band-pass filter 24 which passes only the frequency range of the pilot signal and is followed by a variable-gain amplifier 241 and a demodulator 25. The demodulated sequence of amplitude information is fed to the rotating switch 27, from whose "contacts" the volume information associated with the individual time channels is taken and applied to storage capacitors 28, 29 and 30 and to further storage capacitors (not shown). The storage capacitors deliver the volume information of the individual channels to modulators 31, 32, 33, etc., which, in turn, modulate synthetic signals from the oscillators 34, 35 and 36, which generate the equivalent frequencies for the respective partial range. 371 is the adder circuit with which the volume-controlled equivalent signals are added.

The equivalent signals, added in this way are applied via a controllable switch 563 to another adder circuit 564 where they and the directly transferred signal of the lower frequency range are added together. The signal reaching the loudspeaker 42 contains also the pilot signal. Since, as assumed hereinabove, the pilot signal is inaudible because of the reduction by the factor P and the utilization of the masking effect, it need not be eliminated by a filter. The rotating switch 27 is controlled by a clock generator 55, which determines the step frequency of the rotating switch 27.

After *n* steps the rotating switch 27 has performed one rotation. The frequency divider 54, which has a division factor of $1/2n$, divides the clock frequency, and the voltage obtained in this way is fed to a multiplicative mixer 53, which compares the phase of the signal coming from 54 with that of the demodulated pilot signal. The output voltage of the multiplicative mixer 53 passes through a very narrow-band low-pass filter 56 with, e.g., 0.5 Hz bandwidth. Through this phase comparison in the multiplicative mixer 53 between the divided signal and the sync signal contained in the pilot signal, a phase dependent control voltage is developed at the output of the low pass filter 56; this voltage is used to control the frequency of the clock generator 55. During this processing, the main information, which is contained in the pilot signal and has a substantially greater amplitude than the sync signal, is eliminated as a result of the multiplicative mixing with a reference signal of half the repetition frequency and because of the smaller bandwidth of the low-pass filter 56. The control sensitivity of the synchronization must be so high that at all frequency departures occuring between the output signal of the frequency divider 54 and the frequency of the sync signal, the phase deviation in the synchronized state will be so small that the allocation of the individual channels by the rotating switch at the receiving end will be in agreement with the corresponding allocation at the transmitting end. If, for example, 12 channels are transmitted and the phase deviation is 360°:12=30°, a false allocation of one channel will take place. Therefore, the phase departure during synchronization should not exceed ±10°. In addition, the synchronizing range should be symmetrical, i.e., in case of frequency departures in both directions, the lock-in and hold ranges should be approximately equal.

The clock generator 55 controls another frequency divider 541 which also has the division factor $1/2n$, but whose output voltage always leads or lags the output voltage of the first frequency divider by 90°. The practical realization of this will be explained in more detail with the aid of FIG. 5. The output voltage of this second frequency divider 541 is also compared, in a second multiplicative mixer 531, with the demodulated pilot signal. This multiplicative mixer 531, too, is followed by a low-pass filter 561.

Under the above synchronizing condition, the output voltage of the low-pass filter 561 is positive or negative depending on whether the output voltage of the frequency divider 541 lags or leads by 90°, and has an amplitude which is proportional to the synchronizing voltage amplitude contained in the pilot signal. Since, as assumed hereinabove, the amplitude of this synchronizing signal is proportional to the possible maximum amplitude of the total pilot signal, it is possible according to the invention to use the voltage delivered by the low-pass filter to readjust, with the aid of the variable gain amplifier 241, the amplitude of the pilot signal appearing at the output of the band-pass filter 24. Thus, in case of transmission path variations e.g., in case of selective fading in the pilot frequency range, these variations can be substantially reduced by the above-described control. In addition, the voltage delivered by the low-pass filter 561 may serve to control the switch 563, with which the equivalent tones are switched off. To this end, this voltage is fed through a threshold switch, symbolized in FIG. 5 by a zener diode 562. When the threshold voltage is exceeded, the switch 563 will be closed, and the equivalent tones applied to the loudspeaker for reproduction. When the voltage drops below the threshold voltage, the switch will remain open. Thus, if transmissions without pilot signal are received or if the pilot signal fails, the switch 563 will remain open because, in this case, the low-pass filter 561 delivers no voltage (0 V). However, if a pilot signal is received and no synchronization has taken place, e.g. due to faulty operation of the synchronizing circuit or in case of too great a frequency departure of the sync signal, the switch 563 will remain open as well since, if the frequency departure between the synchronizing signal and the reference signal is so great that no synchronization will take place, the difference frequency of the output voltage of the multiplicative mixer 531 will be so high as to safely lie above the cut-off frequency of the low-pass filter. The cut-off frequency of the low-pass filter 561 should be equal to or smaller than that of the low-pass filter 56. Thus, under the circumstances assumed above, no voltage (0 V) or a voltage lying below the above referred to threshold value will appear at the output of the low-pass filter 561.

Figure 6:
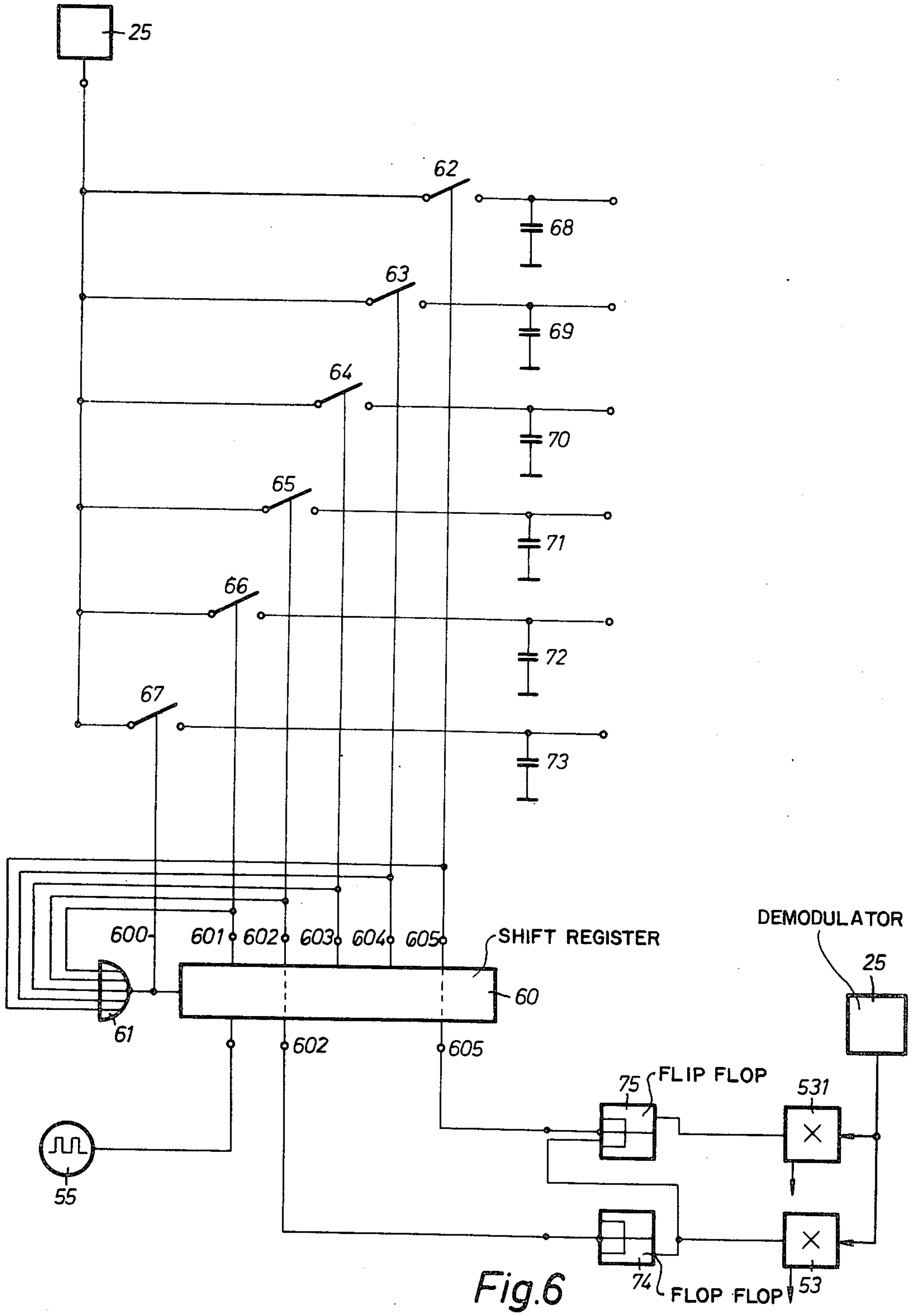
FIG. 6 shows a schematical block diagram of an electronic switch for six partial high frequency ranges.

FIG. 6 shows a six channel embodiment of an electronic rotating switch that may be used in the circuit of FIG. 5. A five-stage shift register 60 has outputs 601 to 605 connected via a NOR-gate 61 to its input 600. The clock generator 55 advances the shift register step by step. As a result of the outputs reacting via the NOR-gate 61 on the input, a control pulse always appears only either at the input terminal 600 or at the output terminals 601 to 605; this control pulse is used to successively switch the individual switches 62 to 67 of the electronic rotating switch. The outputs of these switches are connected to the storage capacitors 68 to 73, whose function corresponds to that of the storages 28 to 30 of FIG. 5, from whose outputs the modulators of the individual channels, e.g. 31 to 33 in FIG. 5, are driven. To generate the reference voltages for the multiplicative mixers 53 and 531, voltages are taken from the shift register 60 at two contacts 602 and 605, whose output voltages are shifted in time with respect to each other by $n/2$ steps of a cycle. Each of these output voltages is fed to a clock input of a so-called J-K flip-flop 74, 75. To insure that the output voltages of the frequency-halving J-K flip-flops always have the same phase relationship, i.e., that, e.g., the output voltage of the flip-flop 75 always lags the output voltage of the flip-flop 74 by 90°, the output of the flip-flop 74 is connected to the appropriate input of the flip-flop 75. In addition, the multiplicative mixers 531 and 53 are provided with the demodulated pilot signal, as shown in FIG. 5.

It is self-evident that the time assignment of the sync signal contained in the pilot signal to the time channels for the individual equivalent signals is the same at the pick-up and reproducing ends.

In applications where major frequency departures of the total signal and thus of the sync signal are likely, the multiplicative mixer 53, operating as a phase comparator, is particularly advantageously replaced by a well-known "phase and frequency comparator" or by a well-known circuit in which the bandwidth of the following low-pass filter 56 is substantially increased until synchronization occurs and is not switched back to the original narrow range until after synchronization has occurred.

It is to be understood that the foregoing description of specific examples of this invention is made by way of example only and is not to be considered as a limitation on its scope.

I claim:

1. A transmitter for transferring wide-band sound signals over a narrow frequency range, comprising:

means for receiving the sound signals;

means for dividing the received sound signals into a lower frequency range and a plurality of higher frequency ranges;

means for providing amplitude signals corresponding to the amplitudes of the signals in each of the higher frequency ranges;

means for providing at least one pilot frequency signal;

means for positively modulating the pilot frequency signal with the amplitude signals in such a way that on a time average the amplitude of the modulated pilot frequency signal is lowered with respect to the amplitude of the lower frequency range signals by an amount corresponding to the limit of perceptibility; and means for transferring the signals of the lower frequency range and the modulated pilot frequency signal whereby the lower frequency range signals may be received and reproduced by existing receivers while the pilot frequency signals are inaudible in existing receivers so that the transmitter is compatible with existing systems.

2. A transmitter as described in claim 1, wherein a pilot frequency signal is provided for each higher frequency range and the pilot frequency signals are positively modulated with the amplitude signals so that the modulated pilot frequency signals are transmitted simultaneously.

3. A transmitter as described in claim 1, additionally comprising:

means for sequentially modulating a single pilot frequency signal with the amplitude signals of the higher frequency ranges;

means for providing a sync signal having a level not greater than the noise level of existing receivers and corresponding to the repetition rate of the sequential modulation of the pilot frequency signal; and means for transferring the sync signal so that in existing receivers the sync signal is suppressed along with the moise and is thereby made inaudible.

4. A transmitter as described in claim 3, wherein the sync signal is a sinusoidal voltage transferred simultaneously with the modulated pilot frequency signal and has a frequency corresponding to ½ the repetition frequency of the sequential modulation of the pilot frequency signal.

5. A transmitter as described in claim 3, wherein the sync signal is a trapezoidal voltage containing only odd harmonics and is transferred simultaneously with the modulated pilot frequency signal and has a frequency corresponding to ½ the repetition frequency of the sequential modulation of the pilot frequency signal.

6. A receiver for use in a system having a transmitter of the type that transfers lower frequency range sound signals directly, a pilot frequency signal sequentially modulated by amplitude signals corresponding to the amplitudes of sound signals in a predetermined number N of higher frequency ranges and a sync signal corresponding to the repetition rate of the sequential modulation of the pilot frequency signal, said receiver comprising:

means for receiving and demodulating the modulated pilot frequency signal to provide sequential amplitude signals corresponding to the amplitudes of the signals in the high frequency ranges;

means for providing synthetic signals having frequencies approximately equal to the mid range frequency of each higher frequency range;

means for modulating each synthetic signal with the appropriate amplitude signal;

means for distributing the sequential amplitude signals to the modulating means;

means for receiving and reproducing the modulated synthetic signals and the directly transferred low frequency range sound signals;

means for receiving the sync signal and selectively evaluating the same so that the signal-to-noise ratio of the sync signal corresponds to the signal-to-noise ratio of the lower frequency range; and means responsive to the selected sync signal for controlling and synchronizing said distributing means to assure proper distribution of the sequential amplitude signals.

7. A receiver as described in claim 6, wherein the means responsive to the selected sync signal comprises a clock generator for providing a clock signal to the distributing means and the means for receiving the sync signal comprises a multiplicative mixer connected to receive the sync signal and a signal corresponding to the clock signal.

8. A receiver as described in claim 6 additionally comprising a variable gain amplifier for amplifying the modulated pilot frequency signal.

9. A receiver as described in claim 8, wherein the amplifier gain is controlled by the sync signal.

10. A receiver as described in claim 6, additionally comprising means for switching off the synthetic signals in the event of a sync signal failure or malfunction.

11. A receiver as described in claim 10, wherein the means for switching off the synthetic signals comprises;

a controllable switch connecting the synthetic signals to the reproducing means; and means for evaluating the sync signal and for controlling the controllable switch in response to the level of the sync signal.

12. A receiver as described in claim 7, wherein the signal corresponding to the clock signal has a frequency equal to 1/2N times the frequency of the clock signal.

13. A receiver as described in claim 6, wherein the means responsive to the selected sync signal comprises a clock generator for providing a clock signal to the distributing means and the means for receiving the sync signal comprises, first and second frequency dividers connected to receive the clock signal and in response thereto provide signals having a frequency equal to 1/2N times the frequency of the clock signal, the first divider providing a signal in phase with the clock signal and the second divider providing a signal 90° out of phase with the clock signal, first and second multiplicative mixers each connected to receive the sync signal, the first mixer being connected to the first frequency divider for receiving the signal therefrom and the second mixer being connected to the second frequency divider for receiving the signal therefrom, the mixers each providing an output voltage in response to the received signals, and first and second low pass filters connected to receive the voltage output from the first and second multiplicative mixers respectively for providing low frequency outputs the output of the first low pass filter being connected to the clock generator for synchronizing the clock generator, said receiver additionally comprising means connected to the output of the second low pass filter for switching off the synthetic signals when the output of the low pass filter drops below a predetermined level.

14. A receiver as described in claim 13, additionally comprising a variable gain amplifier for amplifying the modulated pilot frequency signal, said amplifier being connected to the output of the second low pass filter for controlling the gain of the amplifier.

15. A receiver as described in claim 6, wherein the distributing means comprises a plurality of switches and the means responsive to the selected sync signal comprises a clock generator for providing clock pulses and the means for receiving the sync signal comprises:

a shift register connected to said clock generator and responsive to said clock pulses, said shift register having outputs connected to the switches providing signals thereto for successively activating the switches;

a multiplicative mixer connected to receive the sync signal and one of the outputs of said shift register for providing an output voltage in response to the received signals, said clock generator being connected to the multiplicative mixer for receiving the output voltage therefrom whereby the clock generator is synchronized with the sync signal.

16. A receiver as described in claim 6, wherein the distributing means comprises a switch assembly having N switching means and the means responsive to the selected sync signal comprises a clock generator for providing clock pulses and the means for receiving the sync signal comprises:

shift register means connected to said clock generator and responsive to said clock pulses, said shift register means having outputs connected to the switch assembly for providing pulses thereto for sucessive activation of the switching means;

a first frequency halving flip-flop connected to a first output of said shift register for receiving a pulse therefrom;

a second frequency halving flip-flop connected to a second output of said shift register said second output providing a pulse spaced in time N/2 clock pulses from the pulse of the first output, the output of the first flip-flop being connected to the enabling input of the second flip-flop so that the outputs of the flip-flops are always 90° apart;

first and second multiplicative mixers each connected to receive the sync signal, the first mixer being connected to the output of the first flip-flop and the second mixer being connected to the output of the second flip-flop, the mixers each providing an output voltage in response to the received signals, the output of the first multiplicative mixer being connected to the clock generator for synchronizing the clock pulses and the output of the second mixer being connected to means for switching off the synthetic signals in the event of a sync signal failure or malfunction.

17. A system for transferring wide-band sound signals over a narrow frequency range, comprising:

a transmitter including means for receiving the sound signals, means for dividing the received sound signals into a lower frequency range and a plurality of higher frequency ranges, means for providing amplitude signals corresponding to the amplitude of the signals of each of the higher frequency ranges, means for providing at least one pilot frequency signal, means for positively modulating the pilot frequency signal with the amplitude signals in such a way that on a time average the amplitude of the modulated pilot signal is lowered with respect to the amplitude of the lower frequency range signals by an amount corresponding to the limit of perceptibility, and means for transferring the signals of the lowered frequency range and the modulated pilot frequency signal whereby the lower frequency range signals may be received and reproduced by existing receivers while the pilot frequency signal is inaudible in existing receivers; and a receiver including means for receiving and demodulating the modulated pilot frequency signal to provide amplitude signals corresponding to the amplitudes of the signals in the high frequency range, means for providing synthetic signals having frequencies approximately equal to the mid-range frequency of each higher frequency range, means for modulating each synthetic signal with the appropriate amplitude signal, and means for receiving and reproducing the modulated synthetic signals and the directly transferred low frequency range signals.

* * * * *

UNITED STATES PATENT OFFICE
CERTIFICATE OF CORRECTION

PATENT NO. : 3,894,190

DATED : July 8, 1975

INVENTOR(S) : G.G. Gassmann

It is certified that error appears in the above-identified patent and that said Letters Patent are hereby corrected as shown below:

Column 2, line 37, delete 1/2n and insert $\frac{1}{2n}$.

Column 7, line 57, delete 1/2n and insert $\frac{1}{2n}$.

Column 8, line 24, delete 1/2n and insert $\frac{1}{2n}$.

Claim 12, line 3, delete 1/2N and insert $\frac{1}{2N}$.

Claim 13, line 8, delete 1/2N and insert $\frac{1}{2N}$.

Signed and Sealed this

*second* Day of *December 1975*

[SEAL]

*Attest:*

RUTH C. MASON
*Attesting Officer*

C. MARSHALL DANN
*Commissioner of Patents and Trademarks*